US008020881B2

(12) United States Patent
Stump et al.

(10) Patent No.: US 8,020,881 B2
(45) Date of Patent: Sep. 20, 2011

(54) MOBILITY ASSISTANCE APPARATUS

(76) Inventors: Earl Stump, Arroyo Grande, CA (US); Frank Penner, Arroyo Grande, CA (US)

( * ) Notice: Subject to any disclaimer, the term of this patent is extended or adjusted under 35 U.S.C. 154(b) by 457 days.

(21) Appl. No.: 12/268,727

(22) Filed: Nov. 11, 2008

(65) Prior Publication Data

US 2010/0117326 A1 May 13, 2010

(51) Int. Cl.
*B62M 1/00* (2010.01)

(52) U.S. Cl. .................................... 280/87.041; 280/200

(58) Field of Classification Search .................... 280/38, 280/40, 11.211, 11.215, 11.217, 11.222, 280/11.233, 47.11, 47.12, 47.131, 47.17, 280/47.315, 87.01, 87.021, 87.03, 87.05, 280/87.1, 200, 400, 426, 655.1; 135/65, 135/67

See application file for complete search history.

(56) References Cited

U.S. PATENT DOCUMENTS

| | | | | | |
|---|---|---|---|---|---|
| 33,689 | A | * | 11/1861 | Anderson | 280/11.222 |
| 1,279,966 | A | * | 9/1918 | Baker | 280/302 |
| 1,365,482 | A | * | 1/1921 | Liebau et al. | 280/7.12 |
| 1,472,164 | A | * | 10/1923 | Gilbert | 280/87.041 |
| 1,483,033 | A | * | 2/1924 | Wisman | 280/1.186 |
| 1,617,357 | A | * | 2/1927 | Walter | 280/221 |
| 1,778,928 | A | * | 10/1930 | Baker | 280/87.05 |
| 1,810,380 | A | * | 6/1931 | Van Etten | 280/11.217 |
| 1,885,158 | A | * | 11/1932 | Vogt | 280/11.26 |
| 2,033,037 | A | * | 3/1936 | Lang | 280/62 |
| 2,134,318 | A | * | 10/1938 | Ruzich | 280/87.041 |
| 2,185,698 | A | * | 1/1940 | Wright | 280/251 |
| 2,439,556 | A | * | 4/1948 | Bancroft | 280/87.041 |
| 2,597,748 | A | * | 5/1952 | Powell | 280/87.041 |
| 3,309,104 | A | * | 3/1967 | Gold | 280/87.041 |
| 3,620,547 | A | * | 11/1971 | Vaverek | 280/87.042 |
| 4,003,582 | A | * | 1/1977 | Maurer | 280/11.215 |
| 4,033,596 | A | * | 7/1977 | Andorsen et al. | 280/842 |
| 4,055,234 | A | * | 10/1977 | Burton | 188/2 R |
| 4,065,146 | A | * | 12/1977 | Denzer | 280/278 |
| 4,076,267 | A | * | 2/1978 | Lipscomb | 280/87.042 |
| 4,123,079 | A | * | 10/1978 | Biskup | 280/87.042 |
| 4,145,065 | A | * | 3/1979 | Kupka | 280/87.041 |
| D253,062 | S | * | 10/1979 | Kupka | D21/423 |
| 4,251,105 | A | * | 2/1981 | Barker | 297/6 |
| 4,359,231 | A | * | 11/1982 | Mulcahy | 280/87.01 |
| 4,384,713 | A | | 5/1983 | Deutsch | |
| 4,461,471 | A | | 7/1984 | Brastow | |
| 4,552,372 | A | * | 11/1985 | Jones | 280/87.041 |
| 4,555,122 | A | * | 11/1985 | Harvey | 280/87.041 |
| 4,570,739 | A | * | 2/1986 | Kramer | 180/216 |
| 4,700,730 | A | | 10/1987 | Samuelson | |
| 4,799,702 | A | * | 1/1989 | Wang | 280/87.041 |
| 4,941,496 | A | * | 7/1990 | Berning | 135/67 |
| 4,953,851 | A | | 9/1990 | Sherlock | |
| 4,953,886 | A | * | 9/1990 | Grant | 280/640 |
| 4,962,781 | A | * | 10/1990 | Kanbar | 135/65 |
| 5,077,513 | A | * | 12/1991 | Dea et al. | 320/115 |
| 5,158,313 | A | * | 10/1992 | Becker | 280/87.021 |
| 5,364,120 | A | * | 11/1994 | Shimansky | 280/650 |
| 5,375,859 | A | * | 12/1994 | Peck et al. | 280/11.217 |
| 5,390,753 | A | | 2/1995 | Parker | |

(Continued)

*Primary Examiner* — J. Allen Shriver, II
*Assistant Examiner* — Brodie Follman
(74) *Attorney, Agent, or Firm* — Philip A. Steiner

(57) ABSTRACT

A mobility assistance apparatus having an elongated frame. The elongated frame includes a pair of disparate sized wheels coupled to each end of an elongated frame. A pivoting joint is provided longitudinally in the elongated frame which allows the second wheel to track the first wheel in a lateral arc about the along a longitudinal centerline of the first wheel.

19 Claims, 2 Drawing Sheets

U.S. PATENT DOCUMENTS 5,409,028 A 4/1995 Lee
5,505,474 A * 4/1996 Yeh .......................... 280/87.042
5,509,152 A 4/1996 Kippes
5,538,268 A 7/1996 Miller
5,848,660 A * 12/1998 McGreen ...................... 180/206
5,927,733 A * 7/1999 Banda ...................... 280/87.041
6,102,420 A * 8/2000 Hoeksta ........................ 280/269
6,116,621 A * 9/2000 Flater ....................... 280/11.212
6,217,056 B1 * 4/2001 Tsuchie ........................ 280/639
6,234,501 B1 * 5/2001 Chen ........................ 280/87.041
6,244,605 B1 * 6/2001 Liu .......................... 280/87.041
6,338,494 B1 * 1/2002 Killian ..................... 280/87.042
6,352,270 B1 * 3/2002 Wu .......................... 280/87.041
6,435,539 B1 * 8/2002 Wu ............................... 280/652
6,481,729 B2 * 11/2002 Herman et al. ............ 280/87.05
6,485,039 B1 * 11/2002 Ming-Fu .................. 280/87.041
6,572,130 B2 * 6/2003 Greene et al. ................. 280/266
6,619,678 B2 * 9/2003 van Ardenne ............ 280/87.041
6,651,993 B1 * 11/2003 Emerzian et al. .......... 280/47.34
6,685,201 B1 * 2/2004 Smith, III .................. 280/87.01
6,688,633 B2 2/2004 van't Schip
6,719,310 B1 * 4/2004 Lin .......................... 280/87.041
6,739,606 B2 * 5/2004 Rappaport ............... 280/87.041
6,808,187 B1 * 10/2004 Harris ........................ 280/87.01
6,908,091 B2 * 6/2005 Chuang .................... 280/87.041
D513,629 S * 1/2006 Sramek ........................ D21/423
6,991,242 B2 * 1/2006 Teng et al. ............... 280/87.041
7,083,178 B2 * 8/2006 Potter ...................... 280/87.042
7,192,038 B2 * 3/2007 Tsai ......................... 280/87.041
7,540,517 B2 * 6/2009 Wernli .......................... 280/278
7,549,655 B2 * 6/2009 Fan .......................... 280/87.041
7,597,334 B2 * 10/2009 Chen ........................ 280/87.041
7,600,768 B2 * 10/2009 Chen et al. ............... 280/87.042
7,699,325 B2 * 4/2010 Durbin ....................... 280/47.11
7,744,111 B2 * 6/2010 Anderson ..................... 280/492
2001/0035621 A1 * 11/2001 Herman et al. .......... 280/87.041
2002/0096850 A1 * 7/2002 Lu ............................ 280/87.042
2002/0167141 A1 * 11/2002 Humphrey ............... 280/87.041
2002/0167146 A1 * 11/2002 Chang ...................... 280/87.041
2003/0001351 A1 * 1/2003 Schauble et al. ........... 280/87.05
2003/0034622 A1 * 2/2003 van Ardenne .............. 280/87.05
2003/0132592 A1 * 7/2003 Dombroski ................ 280/87.01
2004/0075230 A1 * 4/2004 Lin .......................... 280/87.041
2004/0080130 A1 * 4/2004 Lewis ...................... 280/87.041
2004/0094919 A1 * 5/2004 Roder et al. .................... 280/30
2004/0217565 A1 * 11/2004 Ramm ....................... 280/87.01
2005/0039256 A1 * 2/2005 Price et al. ....................... 5/86.1
2005/0206108 A1 * 9/2005 Chung ......................... 280/87.1
2005/0248112 A1 * 11/2005 Iavarone et al. ......... 280/87.041
2006/0103097 A1 * 5/2006 Chen .......................... 280/87.05
2007/0034243 A1 2/2007 Miller
2007/0182116 A1 * 8/2007 Davey et al. ............... 280/87.05
2008/0042403 A1 * 2/2008 Anderson ..................... 280/656
2008/0078431 A1 4/2008 Battiston
2008/0203691 A1 * 8/2008 Hsu .......................... 280/87.041
2008/0315544 A1 * 12/2008 Jackman et al. ........... 280/87.05
2009/0194142 A1 * 8/2009 Zimmerman ................... 135/67
2009/0212519 A1 * 8/2009 Chen et al. ................. 280/87.01
2009/0273152 A1 * 11/2009 Chung ..................... 280/87.042
2009/0278327 A1 * 11/2009 Chan .......................... 280/87.05
2010/0059955 A1 * 3/2010 Steinbach ................ 280/87.041
2010/0117326 A1 * 5/2010 Stump et al. .................. 280/200
2010/0270764 A1 * 10/2010 Odle et al. ................. 280/47.19

* cited by examiner

MOBILITY ASSISTANCE APPARATUS

CROSS-REFERENCE TO RELATED APPLICATIONS

Not Applicable

RELEVANT INVENTIVE FIELD

The various exemplary embodiments relate generally to an apparatus for improving mobility and more specifically to a rolling mobility apparatus.

BACKGROUND

Individuals experiencing difficulty with mobility due to an injury or disease frequently rely on such common day items as a crutch or a cane. Those with more serious mobility issues may be required to use a walker. In many respects, these apparatuses only provide a partial solution to the individual's needs. Accordingly, an improved mobility assistance apparatus would be desirable to those individuals in which a walker, crutch or cane does not provide sufficient mobility.

SUMMARY

The various exemplary embodiments disclosed herein address a long felt need in mobility assistance apparatuses. In an exemplary embodiment, an elongated frame is provided which is divided into a first frame element and second frame element. The first frame element includes a front wheel coupled to one end of the elongated frame. The first wheel is restricted in rotational travel to an axis along a longitudinal centerline of the first frame element. The second frame element includes a rear wheel coupled to an opposite end of the elongated frame. The second wheel is analogously restricted in rotational travel to an axis along a longitudinal centerline of the second frame element.

In an exemplary embodiment, the front wheel has a larger diameter than the rear wheel, typically having a front to rear wheel diameter ratio of about 1.3 to 1.

A pivoting joint is provided which longitudinally couples the first frame element with the second frame element. The pivoting joint is configured to allow the second wheel to track the first wheel in a lateral arc about a longitudinal centerline of the first frame element. In an exemplary embodiment, the pivoting joint allows the second frame element to pivot up to 30 degrees either side of the longitudinal centerline of the first frame element.

A handle assembly is coupled to the elongated frame which allows the user to apply a generally downward or tangential force relative to the elongated frame such that the mobility assistance apparatus moves in cooperation with movement of the user. In an exemplary embodiment, the handle assembly is attached perpendicularly to the elongated frame, typically in juxtaposition to the pivoting joint.

In an exemplary embodiment, the handle assembly is provided with a telescoping element to allow for height adjustment to a particular user. A handle is provided at an end opposite to where the handle assembly attaches to the elongated frame.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments as is defined by the claims.

DETAILED DESCRIPTION

Figure 1:
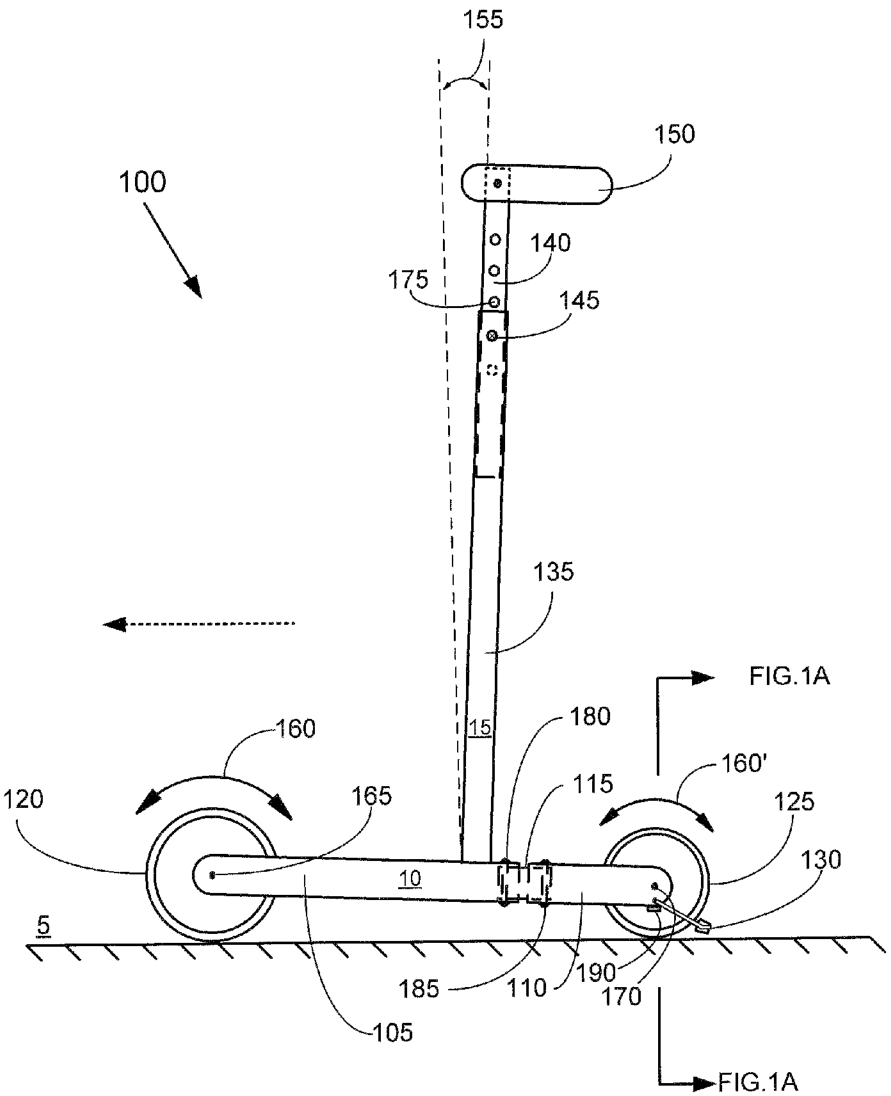
FIG. 1—depicts a side view of a mobility assistance apparatus in accordance with an exemplary embodiment.

The various inventive embodiments described below address a long felt need in mobility assistance apparatuses which allow a user to travel in non-linear movements without repeated lifting or repositioning of the mobile assistance apparatus. Referring to FIG. 1, a side view of a mobility assistance device 100 in accordance with an exemplary embodiment is depicted. The side opposite to the view shown in FIG. 1 is essentially a mirror image of FIG. 1.

Figure 2:
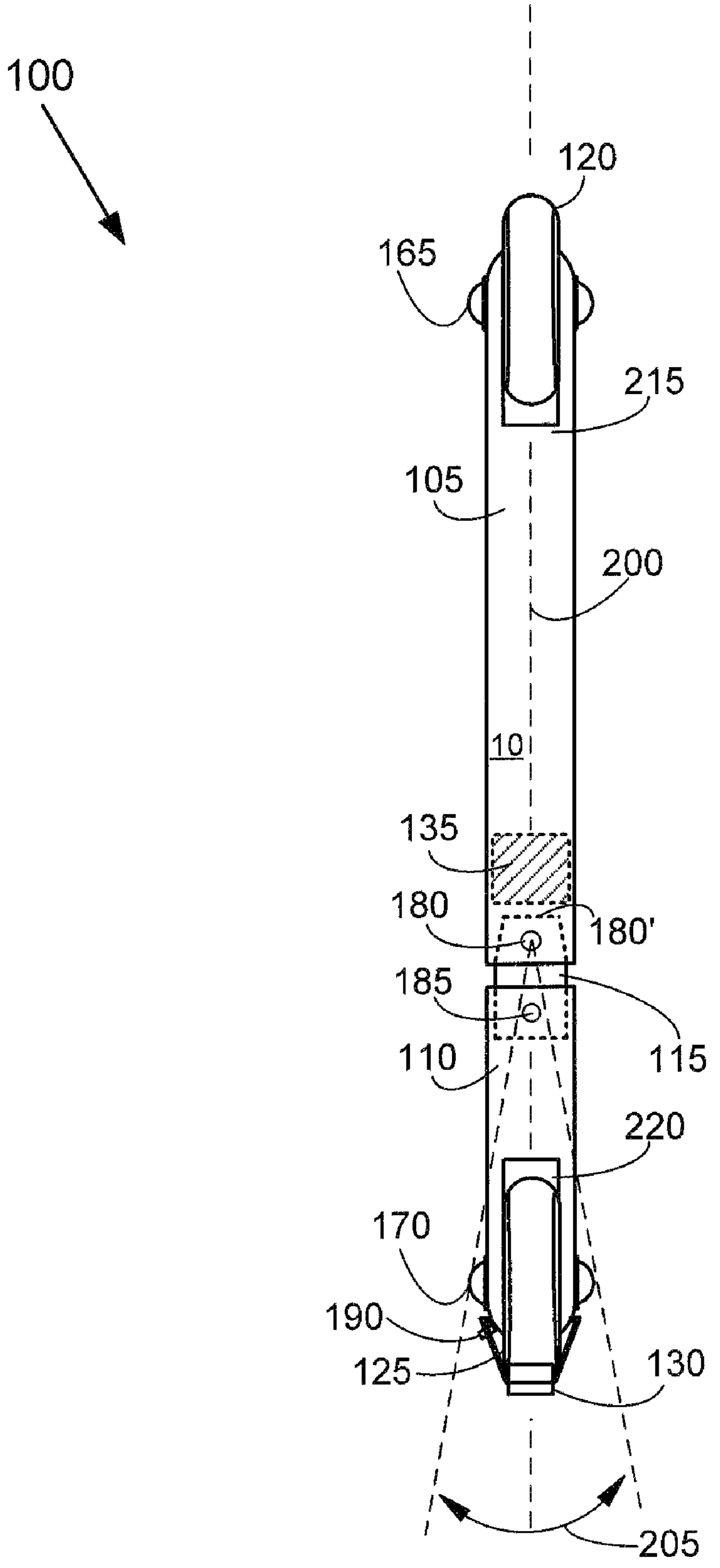
FIG. 2—depicts a top view of a mobility assistance apparatus in accordance with an exemplary embodiment.

In an embodiment, an elongated frame 10 is provided. Elongated frame 10 is divided into a first frame element 105 and a second frame element 110 which are longitudinally joined together by a pivoting joint 115. Pivoting joint 115 is configured to permit second frame element 110 to pivot about a longitudinal axis 205 (FIG. 2). A front wheel 120 is connected to first frame element 105 by a laterally aligned front axle 165. Front wheel 120 is maintained in a fixed rotational alignment 160 (fore and aft) by front axle 165 within a wheel well cut 215 (FIG. 2) into first frame element 105.

In an embodiment, first and second frame elements 105, 110 are constructed from tubular stock. The tubular stock may be made from any suitable material, such as aluminum, steel, fiberglass, polycarbonate, carbon fibers, high impact plastics (e.g., ABS). The tubular stock may have a rounded and/or square cross section. The choice of construction materials is simply one of cost or availability. In an embodiment, pivoting joint 115 may be constructed from tubular or solid stock having a somewhat smaller diameter than first and second frame elements 105, 110 and is coaxially inserted into each non-wheel end of first and second frame elements 105, 110. Friction reduction elements (not shown) such as nylon or Teflon® washers may be installed to reduce friction of pivoting joint 115 during lateral movement.

Pivoting joint 115 is connected to first and second frame elements 105, 110 by a pair of fasteners 180, 185. The cross section of tubular stock used for pivoting joint 115 determines the amount of lateral travel allowed by second frame element 110 when tracking first frame element 105. A rear tire 125 is connected to second frame element 110 by a laterally aligned rear axle 170. Rear wheel 125 is maintained in a fixed rotational alignment 160' (fore and aft) by rear axle 170 within a wheel well cut 220 (FIG. 2) into second frame element 105, analogous to the arrangement provided for first frame element 105. One skilled in the art will appreciate that front and rear wheels 120, 125 may be attached to first and second frame elements 105, 110 by separate wheel assemblies rather than via wheel wells 215, 220 (FIG. 2).

In an embodiment, rear wheel 125 includes a brake assembly 130 pivotally attached to second frame element 110 and connected to second frame element 110 subjacent to rear axle 170. Brake assembly 130 is mounted eccentrically rearward with respect to the lateral axis of rear axle 170, such that a rotational arc for brake assembly 130 intercepts rear wheel 125 to provide braking action. Brake assembly 130 is aligned in close juxtaposition with rear wheel 125 during normal rotation of rear wheel 125 and is maintained in place against a stop 190 by gravity. However, a sudden rapid tilting of mobility assistance device 100, such as when an uncontrolled movement occurs, causes brake assembly 130 to rotate around rear wheel 125 by contact with the rolling surface 5 (FIG. 1) until an edge of brake assembly 130 forcibly engages rear wheel 125, thus halting rotational movement 160'. Brake assembly 130 is provided as an optional safety feature to prevent mobility assistance apparatus 100 from slipping away from a user.

In an embodiment, a handle assembly 15 is perpendicularly connected to first frame element 105 at a position adjacent to pivoting joint 115. In an embodiment, handle assembly 15 is likewise constructed of tubular stock. A base section 135 of handle assembly 15 is attached at one end to first frame element 105. An opposite end of base section 135 is configured to receive a telescoping section 140 which includes a handle 150 for gripping by the user. Telescoping section 140 is sized to coaxially slide up and down within base section 135 to allow height adjustment to comfortably suit a particular user. Once a comfortable height has been selected, a pin or fastener 145 is inserted into a predrilled pilot hole 175 in base and telescoping sections 135, 140 to maintain telescoping section 140 at the desired height. Handle assembly 15 may be fastened or welded to first frame element 105.

In an embodiment, front wheel 120 is sized with a larger diameter than rear wheel 125. A typical front to rear wheel diameter ratio is about 1.3:1. The disparate sized wheels allows mobility assistance apparatus 100 to tilt 155 slightly rearward when placed on rolling surface 5. Tilt 155 improves the user's leverage and in addition, simplifies the user's ability to "steer" mobility assistance apparatus 100 around obstacles and maneuver mobility assistance apparatus 100 non-linearly. Rolling of mobility assistance apparatus 100 also avoids repeatedly lifting or carrying of the apparatus around obstacles.

Figure 1A:
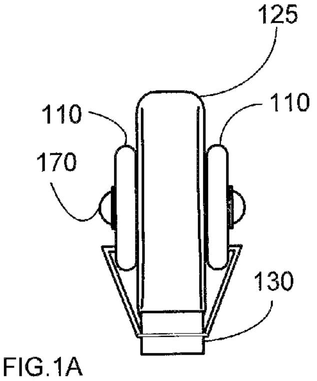
FIG. 1A—depicts a detailed view of a brake mechanism for use with a mobility assistance apparatus in accordance with an exemplary embodiment.

FIG. 1A depicts a detailed view of brake mechanism 130 for use with mobility assistance apparatus 100 in accordance with an exemplary embodiment. As discussed above, mechanically operated brake assembly 130 is provided and is used to prevent mobility assistance apparatus 100 from slipping away from the user. Brake assembly 130 is maintained in its normal position in close proximity to rear wheel 125 by resting on stop 190 by gravity. A sudden vertical tilting of mobility assistance device 100 causes brake assembly 130 to rotate counter clockwise into rear wheel 125 which stops rotation. Eccentrically mounted brake assembly 130 is configured to rotate in an arc which intercepts rear wheel 125 thus providing the braking action. In another embodiment (not shown), brake assembly 130 is configured to operate centripetally. In this embodiment, a portion of brake assembly 130 remains in slight contact with rear wheel 125. A rapid acceleration of rear wheel 125 causes brake assembly 130 to rotate counterclockwise into rear wheel 125 which provides the braking action. One skilled in the art will appreciate that other braking mechanisms may be employed as well.

FIG. 2 depicts a top view of mobility assistance apparatus 100 in accordance with an exemplary embodiment. For simplicity and clarity of understanding, only the attachment area for base section 135 of handle assembly 15 is shown. In an embodiment, front and rear wheels 120, 125 are aligned along a longitudinal centerline 200 of elongated frame 10. Pivoting joint 115 allows second frame element 110 to pivotally track the direction of front wheel 120 by allowing rear wheel 125 to travel in an arc 205 about the longitudinal centerline 200. Travel of rear wheel 125 is limited by the amount of lateral movement provided by pivoting joint 115. In an embodiment, the amount of lateral movement of rear wheel is approximately 30 degrees either side of longitudinal centerline 200.

In another embodiment, the amount of lateral movement of rear wheel 125 is approximately 15 degrees either side of longitudinal centerline 200. The fixed rotational geometry of front and rear wheels 120, 125 maintained by front and rear lateral axles 165, 170 simplifies construction and also provides a safety benefit which minimizes chances for one or both wheels becoming misaligned during movement.

Front and rear wheel wells 215, 220 are dimensioned to receive front and rear wheels 120, 125 and any associated bearing races (not shown) with a snug fit to prevent wobbling of front and rear wheels 120, 125 on their axles 165, 170. Fasteners 180, 185 may be of any type including but not limited to rivets, bolts, welds, dowel pins, etc.

In an exemplary embodiment, pivoting joint 115 includes a trapezoidal or triangular end profile 180' which allows second frame element 110 to pivot about fastener 180 installed in first frame element 105. The shape of trapezoidal or triangular end profile 180' controls the amount of pivoting 205 afforded to second frame element 110. One skilled in the art will appreciate that this arrangement may be reversed where trapezoidal or triangular end profile 180 of pivoting joint 115 is coaxially maintained by second frame element 110 and/or pivots about second fastener 185.

In another exemplary embodiment, pivoting joint 115 is constructed of coaxially disposed tubing. In this embodiment, differences in the tubing diameters between pivoting joint 115 and first frame element 105 controls the amount of pivoting 205 afforded to second frame element 110. One skilled in the art will appreciate that a polymeric element having suitable elasticity may be used as a replacement for pivoting joint 115.

In an exemplary embodiment, the length of elongated frame 10, including the pivoting joint 115 is approximately 12 inches long. In this exemplary embodiment, front wheel is about 4 inches in diameter and rear wheel is 3 inches in diameter. In an exemplary embodiment, base section 135 of the handle assembly 15 is approximately 30 inches high and is perpendicularly connected to first frame element 105 approximately 6 inches from the end in which first wheel 120 is attached. In an embodiment, telescoping section 140 of handle assembly 15 is approximately 6 inches long and is dimensioned to coaxially fit into base section 135 of handle assembly 15. The overall height of handle assembly 15 is controlled by a fastener 145 inserted to a selected height adjustment aperture 170. A rearward directed handle 150 is attached to an end of the telescoping section 140 at proximately a right angle. The diameter of handle 150 is sized to accommodate a comfortable grip by a user. One skilled in the art will appreciate that a continuously adjustable clamping mechanism (not shown) may be used as an alternative to fastener 145 and aperture 170.

Mobility assistance apparatus 100 is used analogously to that of a cane with the exception of not having to lift, carry or reposition mobility assistance apparatus 100 after each step. Mobility assistance apparatus 100 is simply pushed by the user thus minimizing shoulder, arm and/or hand fatigue. In addition, the rolling action of mobility assistance apparatus 100 allows the user to traverse many different horizontal surface contours and avoid obstacles with minimal lifting or turning of the mobility assistance apparatus 100.

The various inventive embodiments described herein are intended to be merely illustrative of the principles underlying the inventive concept. Depending on user preferences, the mobility assistance apparatus 100 may pressed against the user's side to help hold the mobility assistance apparatus 100 in proper orientation with rolling surface 5 (FIG. 1). The choice of user's side in which mobility assistance apparatus 100 is placed is that of the user. Some users may prefer to place mobility assistance apparatus 100 on a side opposite to the side having impaired movement or visa versa.

It is therefore contemplated that various modifications of the disclosed embodiments will, without departing from the inventive spirit and scope, be apparent to persons of ordinary skill in the art. They are not intended to limit the inventive embodiments to any precise form described. In particular, it is contemplated that the dimensions of mobility assistance apparatus 100 and construction materials may be changed to accommodate various specific applications. Accordingly, no specific limitation is intended for a particular construction material or any exemplary dimensions described herein. Other variations and inventive embodiments are possible in light of above teachings, and it is not intended that this Detailed Description limit the inventive scope, but rather by the Claims following herein.

What is claimed:

1. A mobility assistance apparatus comprising:

an elongated frame including;

a first frame element having a front wheel coupled thereto, the front wheel having a fixed rotational axis along a longitudinal centerline of the first frame element;

a second frame element having a second wheel coupled thereto, the second wheel having a fixed rotational axis along a longitudinal centerline of the second frame member;

a pivoting joint which couples the first frame element with the second frame element; the pivoting joint configured to allow the second wheel to track the first front wheel in a lateral arc;

a handle assembly coupled to the elongated frame at an angle; the handle assembly configured for allowing a user to apply a generally downward or tangential force relative to the elongated frame such that the mobility assistance apparatus moves in cooperation with movement of the user; and, wherein the pivoting joint comprises a longitudinally tapered forward end dimensioned to fit within an end of the first frame element in such a way that lateral movement of the tapered forward end within the first frame element limits the lateral arc of the second frame element.

2. The mobility assistance apparatus of claim 1 wherein the front wheel has a larger diameter than the second wheel.

3. The mobility assistance apparatus of claim 1 wherein the front wheel to second wheel diameter ratio is about 1.3 to 1.

4. The mobility assistance apparatus of claim 1 wherein the limit is up to 30 degrees of movement either side of the longitudinal centerline of the first frame element.

5. The mobility assistance apparatus of claim 1 wherein the handle assembly is coupled to the elongated frame at about a 90 degree angle.

6. The mobility assistance apparatus of claim 1 wherein the handle assembly comprises a telescoping element.

7. The mobility assistance apparatus of claim 6 wherein the handle assembly comprises a handle coupled to an end of the telescoping element.

8. The mobility assistance apparatus of claim 7 wherein the handle is coupled at about a 90 degree angle to the telescoping element.

9. The mobility assistance apparatus of claim 1 wherein the handle assembly is coupled in juxtaposition to the pivoting joint.

10. A mobility assistance apparatus comprising:

an elongated frame including;

a front wheel coupled to one end of the elongated frame;

a rear wheel coupled at an opposite end of the elongated frame;

a pivoting joint disposed longitudinally along the elongated frame; the pivoting joint configured to allow the rear wheel to track with the front wheel in a lateral arc about a longitudinal centerline of the elongated frame;

a handle assembly coupled to the elongated frame; the handle assembly configured to allow a user to apply a motive force for movement of the mobility assistance apparatus in cooperation with the user; and, wherein the pivoting joint comprises a longitudinally tapered forward end dimensioned to fit within an end of the first frame element of the elongated frame in such a way that lateral movement of the tapered forward end within the first frame element limits the lateral arc of a second frame element of the elongated frame.

11. The mobility assistance apparatus of claim 10 wherein the handle assembly includes a handle coupled to an end of a telescoping element for allowing the user to adjust a height of the handle.

12. The mobility assistance apparatus of claim 10 wherein the front wheel has a larger diameter than the rear wheel.

13. The mobility assistance apparatus of claim 10 wherein the front and rear wheels are disparately sized such that when the mobility assistance apparatus is placed on a horizontal surface, the handle assembly has an inclination relative to the horizontal surface.

14. The mobility assistance apparatus of claim 13 wherein the inclination is rearward relative to the mobility assistance apparatus.

15. The mobility assistance apparatus of claim 10 wherein the pivoting joint is configured to allow the rear wheel to track with the front wheel in a lateral arc about a longitudinal centerline of the elongated frame such that the user can non-linearly maneuver the mobility assistance apparatus.

16. A mobility assistance apparatus comprising:

an elongated frame including;

a front wheel coupled to one end of the elongated frame;

a rear wheel coupled at an opposite end of the elongated frame;

a pivoting joint disposed longitudinally along the elongated frame; the pivoting joint configured to allow the rear wheel to track with the front wheel in a lateral arc about a longitudinal centerline of the elongated frame;

a handle assembly coupled to the elongated frame intermediate the front and rear wheels; the handle assembly configured to allow a user to apply a motive force for movement of the mobility assistance apparatus in cooperation with movement of the user;

braking means coupled to the opposite end of the elongated frame in an eccentric rotational relationship with the rear wheel for automatically locking the rear wheel upon a sudden rapid vertical tilting of the mobility assistance device;

wherein the pivoting joint comprises a longitudinally tapered forward end dimensioned to fit within an end of a first frame element of the elongated frame in such a way that lateral movement of the tapered forward end within the first frame element limits the lateral arc of a second frame element of the elongated frame;

wherein a long dimension of the elongated frame and location of where the handle assembly is coupled to the elongated frame inhibits riding of the mobility assistance apparatus; and, wherein the front wheel is larger in diameter than the rear wheel.

17. The mobility assistance apparatus of claim 16 wherein the front wheel to rear wheel diameter ratio is about 1.3 to 1.

18. The mobility assistance apparatus of claim 16 wherein the limit is up to 30 degrees of movement either side of the longitudinal centerline of the first frame element.

19. The mobility assistance apparatus of claim 16 wherein the larger diameter front wheel provides a rearward inclination of the handle assembly when the mobility assistance apparatus is placed on a horizontal surface.

* * * * *